(12) United States Patent
Athad

(10) Patent No.: US 9,409,236 B2
(45) Date of Patent: Aug. 9, 2016

(54) TURNING AND FACE GROOVING TOOL HAVING A PIN CLAMPING MECHANISM

(71) Applicant: Iscar, Ltd., Tefen (IL)

(72) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 237 days.

(21) Appl. No.: 14/339,078

(22) Filed: Jul. 23, 2014

(65) Prior Publication Data

US 2016/0023280 A1    Jan. 28, 2016

(51) Int. Cl.
| | |
|---|---|
| B23B 27/16 | (2006.01) |
| B23B 27/06 | (2006.01) |
| B23B 27/04 | (2006.01) |
| B23B 29/04 | (2006.01) |

(52) U.S. Cl.
CPC ............... B23B 27/06 (2013.01); B23B 27/04 (2013.01); B23B 27/1614 (2013.01); B23B 29/043 (2013.01); *B23B 2205/04* (2013.01); *Y10T 407/229* (2015.01); *Y10T 407/2276* (2015.01); *Y10T 407/2278* (2015.01)

(58) Field of Classification Search
CPC ................ Y10T 407/2272; Y10T 407/2274; Y10T 407/2276; Y10T 407/2278; Y10T 407/2282; Y10T 407/229; B23B 27/1614; B23B 27/1662
See application file for complete search history.

(56) References Cited

U.S. PATENT DOCUMENTS

| | | | | |
|---|---|---|---|---|
| 3,316,616 A | * | 5/1967 | Milewski ............ | B23B 27/1677 407/105 |
| 3,393,435 A | | 7/1968 | Viellet | |
| 3,908,255 A | * | 9/1975 | Faber ................. | B23B 27/1651 407/105 |
| 4,044,440 A | * | 8/1977 | Stier ................... | B23B 27/1662 407/105 |
| 4,632,593 A | | 12/1986 | Stashko | |
| 2003/0031519 A1 | | 2/2003 | Hecht | |
| 2004/0101373 A1 | * | 5/2004 | Isaksson ............. | B23B 27/1614 407/103 |
| 2007/0086863 A1 | * | 4/2007 | Tipu .................... | B23B 27/1662 407/104 |
| 2007/0196187 A1 | * | 8/2007 | Nelson ................ | B23B 27/1662 407/91 |
| 2013/0279997 A1 | | 10/2013 | Hecht | |

FOREIGN PATENT DOCUMENTS

| | | | | |
|---|---|---|---|---|
| DE | 3612244 A1 | * | 10/1986 | .......... B23B 27/1622 |
| EP | 0 090 224 | | 10/1983 | |
| EP | 0450542 A1 | * | 10/1991 | .......... B23B 27/1622 |
| JP | WO 2012153737 A1 | * | 11/2012 | .......... B23B 27/1622 |
| JP | WO 2012161176 A1 | * | 11/2012 | .......... B23B 27/1614 |

OTHER PUBLICATIONS

Search report dated Oct. 7, 2015 issued in PCT counterpart application (No. PCT/IL2015/050667).

* cited by examiner

*Primary Examiner* — Daniel Howell
*Assistant Examiner* — Nicole N Ramos
(74) *Attorney, Agent, or Firm* — Womble Carlyle

(57) ABSTRACT

A turning and face grooving tool body has a pocket and a pin. The pin has a unitary one-piece construction and an elongated shape which defines a longitudinal direction along a pin axis. The pin includes pin top and bottom ends, a pin peripheral surface which extends therebetween, and a pivot protrusion which extends outwardly from the pin peripheral surface. The pin is rotationally asymmetric about the longitudinal pin axis. The pocket includes a base surface, transverse support walls, and a pin bore which opens out to the base surface and includes a pin bore inner surface. The pin is located in the pin bore and the pin top end protrudes beyond the base surface. The pivot protrusion is spaced apart from the pin top and bottom ends, offset in the longitudinal direction from a pin midway-point which is located midway between the pin top and bottom ends.

20 Claims, 3 Drawing Sheets

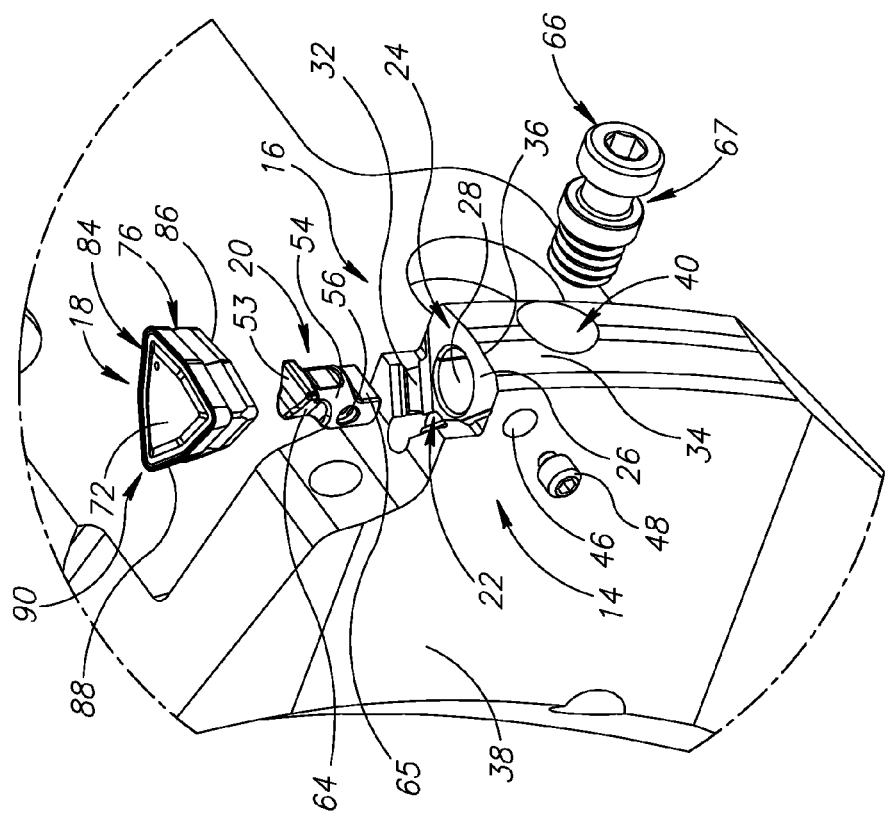
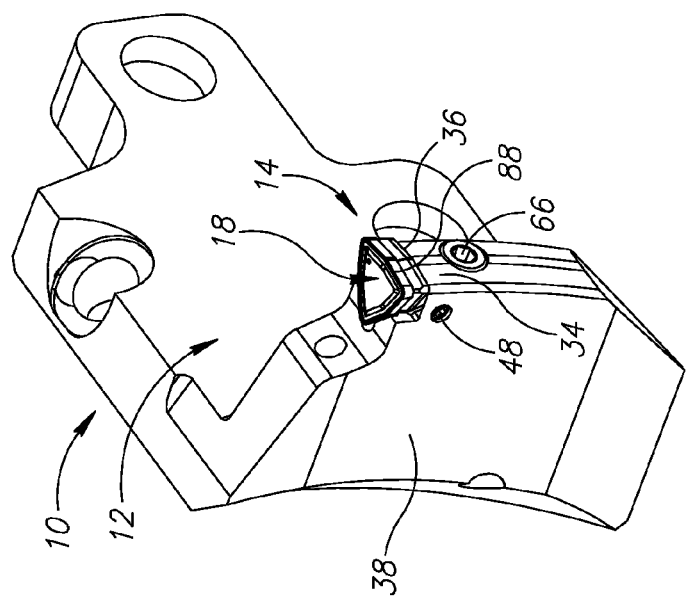
FIG. 2
FIG. 1

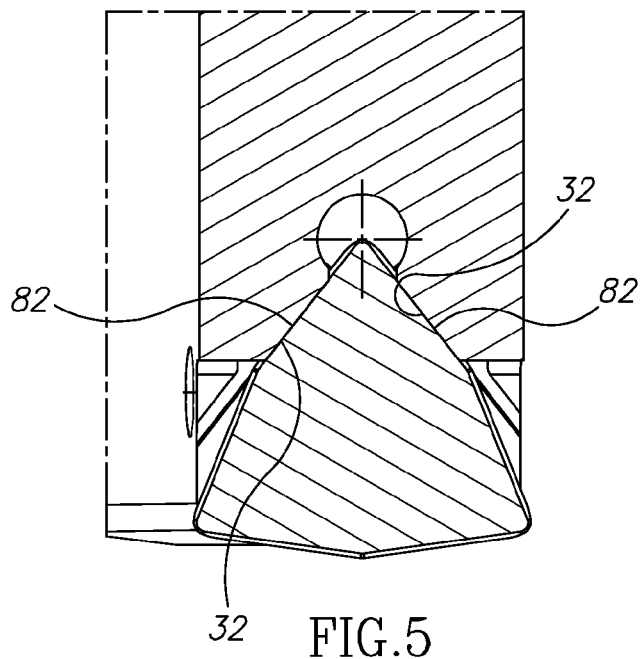
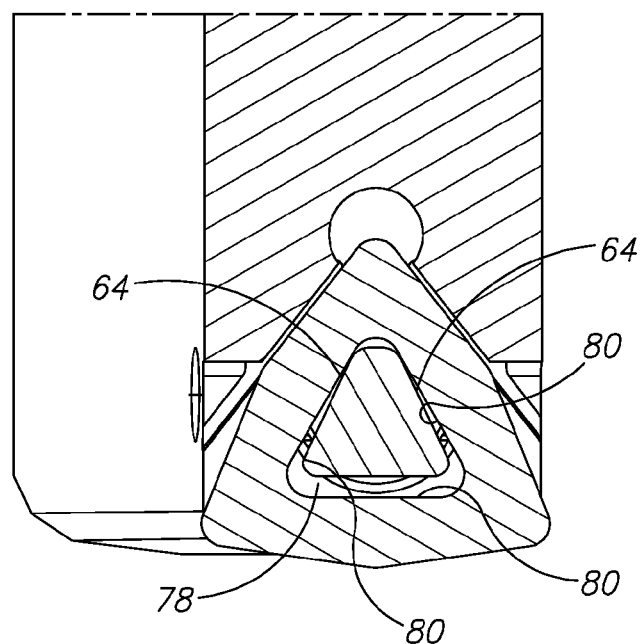

US 9,409,236 B2

TURNING AND FACE GROOVING TOOL HAVING A PIN CLAMPING MECHANISM

FIELD OF THE INVENTION

The subject matter of the present application relates to metal cutting tools, and specifically to cutting tools configured for turning and face grooving operations.

BACKGROUND OF THE INVENTION

Turning tools of the field are known and disclosed, for example, in EP0090224(A1).

SUMMARY OF THE INVENTION

In accordance with the subject matter of the present application there is provided a turning and face grooving tool body which has a pocket and a pin. The pin has a unitary one-piece construction and an elongated shape which defines a longitudinal direction. The pin includes pin top and bottom ends, a pin peripheral surface which extends therebetween, and a pivot protrusion which extends outwardly from the pin peripheral surface. The pocket includes a base surface and transverse support walls which converge in an inward direction parallel to the base surface, and a pin bore which opens out to the base surface and includes a pin bore inner surface. The pin is located in the pin bore and the pin top end protrudes beyond the base surface. The pivot protrusion is spaced apart from the pin top and bottom ends and offset in the longitudinal direction from a pin midway-point which is located midway between the pin top and bottom ends.

The tool body can further include a tool relief surface which extends from the base surface and includes a leverage bore which opens out thereto, the leverage bore intersects the pin bore and includes a female thread; and a cylindrical leverage member with a male thread, the leverage member is screw threaded in the leverage bore and includes a peripheral recess with opposite first and second leverage surfaces.

In accordance with the subject matter of the present application there is further provided a turning tool which includes the tool body, and a turning insert clamped therein via the pin.

Any of the following features, either alone or in combination, may be applicable to any of the above aspects of the subject matter of the application:

The pin top end can have two pin top abutment surfaces which converge in a direction perpendicular to the longitudinal direction.

The pin can be asymmetric in the longitudinal direction.

The pin top end can have a triangular cross section when viewed in the longitudinal direction.

The pin peripheral surface can include a blind holding bore configured to enable holding the pin in place.

The pin bottom end can include opposite first and second bottom abutment surfaces, and the first bottom abutment surface is directed in the same direction as the pivot protrusion.

The pin does not include a bend in the overall elongated shape of the pin in the longitudinal direction.

The pin is not L-shaped.

The pin is devoid of through holes.

The pin has a longitudinal pin axis P which passes through the pin top and bottom surfaces, the pivot protrusion extends away from the pin axis P farther than any other portion thereof.

The turning insert includes insert top and bottom surfaces and an insert peripheral surface which extends therebetween and includes a peripheral abutment surface, the turning insert further includes a clamping hole which includes an internal abutment surface.

In a clamped position of the turning insert:
the pin top end abuts the internal abutment surface;
the pivot protrusion abuts the pin bore inner surface only at a pivot protrusion end; and
the first bottom abutment surface abuts the first leverage surface.

The support walls further converge in a direction away from the base surface.

BRIEF DESCRIPTION OF THE DRAWINGS

For a better understanding of the subject matter of the present application and to show how the same may be carried out in practice, reference will now be made to the accompanying drawings, in which:

FIG. 1 is an isometric view of an assembled turning tool;

FIG. 2 is an isometric exploded view of the turning tool of FIG. 1;

FIG. 5 is a cross-section along line V-V of the turning tool of FIG. 3; and

FIG. 6 is a cross-section along line VI-VI of the turning tool of FIG. 3.

Figure 3:
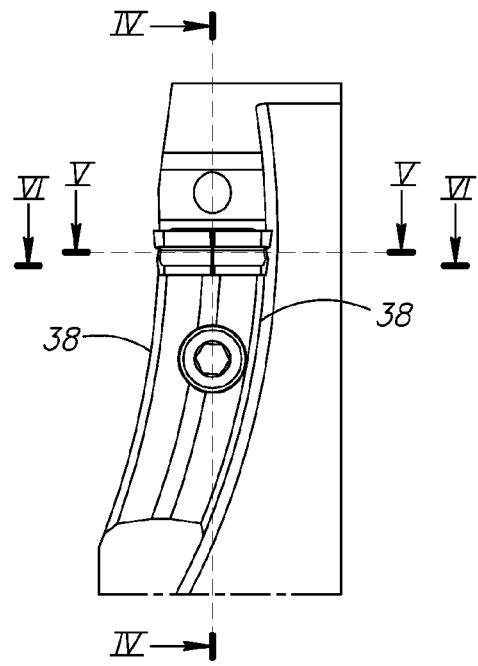
FIG. 3 is a front plan view of the turning tool of FIG. 1, showing a turning insert in a clamped position in a pocket.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Reference is made to FIGS. 1-4. A turning tool 10 includes a tool body 12 and a tool cutting portion 14 which can include a single pocket 16 and a single indexable turning insert 18 secured therein via a pin 20.

The pocket 16 includes inner and outer pocket ends 22, 24 which define an inward to outward direction. The pocket 16 includes a base surface 26, which extends between the inner and outer pocket ends 22, 24, and is configured to abut the turning insert 18. The base surface 26 can be planar, or flat, and includes a pin bore 28 which opens out thereto. The pin bore 28 has a pin bore axis B which can be perpendicular to the base surface 26. The pin bore 28 has a pin bore inner surface 30. The pin bore 28 can be cylindrical.

The pocket 16 further includes support walls 32 configured to abut the turning insert 18. The pocket 16 can include two support walls 32. The support walls 32 extend away from the base surface 26, in an upward direction. The support walls 32 can converge in the inward direction, parallel to the base surface 26, towards the pocket inner pocket end 22. The support walls 32 can converge in the upward direction.

The tool body 12 includes a tool relief surface 34 which meets the base surface 26 at an outer edge 36. The outer edge 36 is located at the outer pocket end 24. As seen in FIG. 3, the tool relief surface 34 extends between opposite tool side surfaces 38. The tool relief surface 34 includes a leverage bore 40 which has a leverage bore axis S. The leverage bore axis S can be oriented parallel to the base surface 26. The leverage bore axis S can be oriented perpendicular to the pin bore axis B. The leverage bore axis S can be oriented parallel to the tool side surfaces 38. The leverage bore 40 intersects the pin bore 28. The leverage bore 40 includes a female thread 42 at an inner leverage bore end 44 thereof. One of the tool side surfaces 38 can include a through holding member bore 46 which opens out to the tool side surface 38 and intersects the pin bore 28. The tool body 12 can include a holding member 48 which is located in the holding member bore 46, and protrudes into the pin bore 28.

Figure 4:
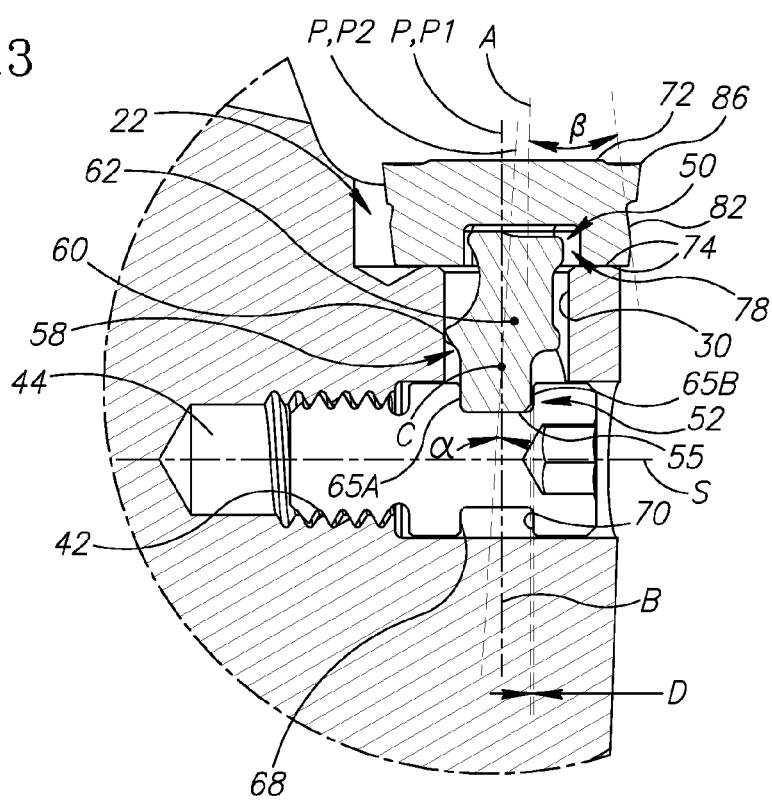
FIG. 4 is a cross-section along line IV-IV of the turning tool of FIG. 3.

Attention is drawn to FIGS. 4-6. The pin 20 is located in the pin bore 28. The pin 20 has a solid, unitary, one-piece construction. The pin 20 is devoid of through holes, which can increase rigidity. The pin 20 has an elongated shape, the elongated shape defines a longitudinal direction of the pin 20. In the present application the word "elongated" should be interpreted as a shape which has a length greater than any dimension perpendicular to the longitudinal direction. The shape of the pin 20 can be cylindrical, or cylindrical-like with an alternating diameter. The word elongated means, in this case, that its length is greater than its greatest diameter. The pin 20 is configured to clamp the turning insert 18 in the pocket 16, into a clamped position, by pressing the turning insert 18 against the support walls 32 as will be disclosed hereinafter. The pin 20 includes pin top and bottom ends 50, 52. The pin top and bottom ends 50, 52 comprise respective pin top and bottom surfaces 53, 55 and a pin peripheral surface 54 which extends therebetween. The pin 20 is asymmetric in the longitudinal direction. In other words, the pin top and bottom ends 50, 52 have different shapes. The pin 20 has a longitudinal pin axis P which passes through the pin top and bottom surfaces 53, 55. The pin 20 is rotationally asymmetric about the longitudinal pin axis P. The pin peripheral surface 54 can include a blind holding recess 56, with which the holding member 48 can cooperate, to prevent the pin 20 from exiting the pin bore 28 when no insert 18 is located in the pocket 16 (and/or no force is applied on the pin 20). The pin is not L-shaped, in order ensure maximum force amplification (e.g., a large bend in the longitudinal shaped of the pin 20 would reduce force amplification, because it would shorten the distance between the top and bottom ends 50, 52 of the pin 20).

The pin 20 includes only a single pivot protrusion 58 which extends outwardly from the pin peripheral surface 54 in a direction away from the pin axis P, as seen, e.g., in FIG. 4. The pin 20 is configured to be pivoted only about a pivot protrusion end 60 on the pivot protrusion 58. The pivot protrusion 58 is therefore the outward-most portion on the peripheral surface 54. In other words, the pivot protrusion 58 extends away from the pin axis P farther than any other portion thereof. As seen in FIG. 4, the pivot protrusion 58 contacts, or engages, the pin bore inner surface 30 only at the pivot protrusion end 60. The pivot protrusion portion end 60 can have, e.g., a stripe shape, a cylindrical shape or a sharp/pointed shape. Pivoting the pin 20 magnifies a force applied on the pin bottom end 52—at the pin top end 50, in order to press and hold the turning insert 18 in the pocket 16, in the clamped position. The pivot protrusion 58 is axially offset from a pin midway-point 62 located midway between, and spaced apart from, the pin top and bottom ends 50, 52. Preferably, the pivot protrusion 58 is axially offset below the pin midway-point 62, toward the pin bottom end 52. When pivoting the pin 20 on the pivot protrusion 58, the axial offset thereof enables the magnification of forces applied onto the pin bottom end 52—at the pin top end 50.

In order to move, or shift, the turning insert 18 into the clamped position (as seen in FIG. 4), the pin axis P, is shifted about the pivot protrusion end 60 from a second pin axis position P2 (when the turning insert 18 is not in the clamped position), to a first pin axis position P1 (when the turning insert 18 is in the clamped position). An intersection point C is defined at the intersection of the first and second pin axis positions P1, P2. An acute shift angle α is defined between the first and second pin axis positions P1, P2. The shift angle α is smaller than 10°. The pin 20 is not pivoted about a point located on the pin axis P, or anywhere internally within the pin 20 (see FIG. 4).

Attention is drawn to FIGS. 1 and 6. The pin top end 50 can have a triangular cross section when viewed in the longitudinal direction. In other words, the pin top end 50 can be v-shaped in an axial view along the pin axis P. The pin top end 50 can include two pin top abutment surfaces 64, both of which extend from the pin top surface 53 in the pin axis P direction. The pin top surface 53 can have a triangular shape. The pin top abutment surfaces 64 can converge in a direction perpendicular to the pin axis P, outwardly away from the peripheral surface 54. The pin top abutment surfaces 64 can be parallel to the pin axis P. The pin bottom end 52 includes first and second bottom abutment surfaces 65A, 65B, which face opposite directions. The first and second bottom abutment surfaces 65A, 65B may be substantially parallel with one another. The first bottom abutment surfaces 65A is directed in the same direction as the pivot protrusion 58.

The tool body 12 includes a leverage member 66, or, according to the present example, a leverage screw. The leverage 66 member can be cylindrical. The leverage member 66 is configured to move the turning insert 18 in and out of the clamped position by respectively moving the pin bottom end 52 outwards and inwards, in the leverage bore 40. In other words, when the leverage member 66 is moved outwardly, the pin bottom end 52 is configured to move outwardly, and due to pivoting about the pivot protrusion end 60, the pin top end 50 moves in the opposite direction, inwardly in the pocket 16, which urges the turning insert 18 into the clamped position.

The leverage member 66 can have a left-hand male thread (corresponding to a left-hand female thread in the leverage bore 40), such that when the leverage member 66 is turned clockwise (a gesture usually associated with an action leading to a closed, end position), it moves outwardly in the leverage bore 40, moving, or shifting the pin axis P into the first pin axis position P1, and the turning insert 18 in to a clamped position. The leverage member 66 can include a peripheral recess 67 which is configured to accommodate the pin bottom end 52. The leverage member 66 includes opposite, first and second leverage surfaces 68, 70 which are configured to respectively engage, the first and second bottom abutment surfaces 65A, 65B when the pin bottom end 52 is located in the peripheral recess 67. The first leverage 68 surface is closer to the thread than the second leverage surface 70.

The turning insert 18 includes an insert top surface 72, an insert bottom surface 74 and an insert peripheral surface 76 which extends therebetween. The turning insert 18 can have a trigon shape in a plan view of the insert top surface 72. The turning insert 18 includes a clamping hole 78. The clamping hole 78 can be a blind hole which opens out only to the insert bottom surface 74. The clamping hole 78 has a clamping hole axis A which can be perpendicular to the insert bottom surface 74. The clamping hole 78 includes, but not limited to, three internal abutment surfaces 80. In the present example, the internal abutment surfaces 80 are perpendicular to the insert bottom surface 74. Every two adjacent internal abutment surfaces 80 converge in an outward direction, towards the insert peripheral surface 76. In the present example, the internal abutment surfaces 80 are parallel to the clamping hole axis A.

The insert peripheral surface 76 can include peripheral abutment surfaces 82 configured to engage the support walls 32 in the pocket 16. Each peripheral abutment surface 82 can form an acute angle β with the clamping hole axis A. In other words, the peripheral abutment surfaces 82 can converge in the clamping hole axis A direction towards the top surface 72. The turning insert 18 includes top and bottom edges 84, 86 formed at the meeting of the insert peripheral surface 76 with the insert top and bottom surfaces 72, 74, respectively. According to the present example, only portions of the top edge 84 are cutting edges 88 along the top edge 84. In other words, the turning insert 18 can be one-sided, or single-sided. The insert peripheral surface 76 includes relief surfaces 77. The insert top surface 72 includes rake surfaces 73. Each cutting edge 88 is formed at each intersection of respective rake and relief surfaces 73, 77. The relief surfaces 77 are spaced apart from the peripheral abutment surfaces 82. The insert peripheral surface 76 can include a step 79 which separates the relief surfaces 77 and the peripheral abutment surfaces 82. The relief surfaces 77 can be located further away from the clamping hole axis A than the peripheral abutment surfaces 82.

According to present example, the turning insert 18 includes three insert cutting portions 90, each of which includes a cutting edge 88. The cutting edge 88 can include a bend at its middle, configured to assist in breaking, or tearing, cut chips.

Attention is drawn to FIGS. 4-6. In the clamped position the turning insert 18 is clamped in the pocket 16 via the pin 20. The majority of the pin 20 is located in the pin bore 28 and the pin top end 50 located in the clamping hole 78. The pin top end 50 protrudes beyond the base surface 26. In the present example, the leverage member 66 is screw threaded in the female thread 42 of the leverage bore 40. The pin bottom end 52 is located in the peripheral recess 67 and the first bottom abutment surface 65A abuts the first leverage surface 68 of the leverage member 66. In the clamped position, a relief space D exists between the second leverage surface 70 and the second bottom abutment surface 65B. The insert bottom surface 74 of the turning insert 18 abuts the base surface 26 of the pocket 16. The peripheral abutment surfaces 82 abut respective support walls 32 (FIG. 5). Each pin top abutment surface 64 abuts a respective internal abutment surface 80 (FIG. 6). The pivot protrusion end 60 is the only portion of the pin 20 which abuts the pin bore inner surface 30.

When the turning insert is not in the clamped position, or it is shifted therefrom (for example, when indexing or replacing the turning insert is required), the second leverage surface 70 can abut the second bottom abutment surface 65B and the relief space D can exist in the opposite side of the pin 20, between the first bottom abutment surface 65A and the first leverage surface 68. It is noted that due to the relatively small shift angle α, the only noticeable visual difference between the two positions of the turning insert 18 is the different location of the relief space D. Therefore, in FIG. 4, the turning insert 18, the leverage member 66 and the pin 20 are only shown in the clamped position, and the second pin axis position P2 is shown for reference, on top on the pin 20.

What is claimed is:

1. A turning and face grooving tool body (12) having a pocket (16) and a pin (20), the pin (20) having a unitary one-piece construction and an elongated shape defining a longitudinal direction along a pin axis P;
the pin (20) comprising:
  pin top and bottom ends (50, 52);
  a pin peripheral surface (54) extending therebetween; and
  a pivot protrusion (58) extending outwardly in a first direction from the pin peripheral surface (54);
the pocket (16) comprising:
  a base surface (26) and transverse support walls (32) which converge in an inward direction of the pocket, parallel to the base surface (26); and
  a pin bore (28) comprising a pin bore inner surface (30) and opening out to the base surface (26);
wherein
  the pin (20) is located in the pin bore (28) and the pin top end (50) protrudes beyond the base surface (26);
  the pin top end (50) has two pin top abutment surfaces (64) which converge in a direction perpendicular to the longitudinal direction;
  the pin (20) is rotationally asymmetric about the longitudinal pin axis P; and
  the pivot protrusion (58) is spaced apart from the pin top and bottom ends (50, 52) and offset in the longitudinal direction from a pin midway-point (62) located midway between the pin top and bottom ends (50, 52).

2. The tool body (12) according to claim 1, wherein the pin (20) is asymmetric in the longitudinal direction.

3. The tool body (12) according to claim 1, wherein the pin top end (50) has a triangular cross section when viewed in the longitudinal direction.

4. The tool body (12) according to claim 1, wherein the pin peripheral surface (54) comprises a blind holding recess (56) configured to enable holding the pin (20) within the pin bore (28).

5. The tool body (12) according to claim 1, wherein the pin bottom end (52) comprises opposite first and second bottom abutment surfaces (65A, 65B), and the first bottom abutment surface (65A) is directed in the same first direction as the pivot protrusion (58).

6. The tool body (12) according to claim 5, wherein the first and second bottom abutment surfaces (65A, 65B) are parallel to one another.

7. The tool body (12) according to claim 1, wherein the pin (20) is not L-shaped.

8. The tool body (12) according to claim 1, wherein the pin (20) is devoid of through holes.

9. The tool body (12) according to claim 1, wherein the longitudinal pin axis P passes through the pin top and bottom surfaces (53, 55), the pivot protrusion (58) extends away from the pin axis P farther than any other portion thereof.

10. The tool body (12) according to claim 1, further comprising:
  a tool relief surface (34) which extends from the base surface (26) and comprises a leverage bore (40) which opens out thereto, the leverage bore (40) intersects the pin bore (28) and comprises a female thread; and
  a cylindrical leverage member (66) with a male thread, the leverage member (66) is screw threaded in the leverage bore (40) and comprises a peripheral recess (67) with opposite first and second leverage surfaces (68, 70).

11. A turning and face grooving tool (10) comprising the tool body (12) according to claim 1, and a turning insert (18) clamped therein via the pin (20) according to claim 1.

12. The turning tool (10) according to claim 11, wherein the turning insert (18) comprises:
  insert top and bottom surfaces (72, 74);
  an insert peripheral surface (76) which extends between the insert top and bottom surfaces (72, 74) and comprises a peripheral abutment surface (82); and
  a clamping hole (78) which comprises an internal abutment surface (80).

13. The turning tool (10) according to claim 12, wherein the clamping hole (78) is a blind hole open only to the insert bottom surface (74).

14. The turning tool (10) according to claim 11, wherein in a clamped position of the turning insert (18):
  a peripheral abutment surface (82) abuts the support walls (32);
  the pin top end (50) abuts an internal abutment surface (80);
  the pivot protrusion (58) abuts the pin bore inner surface (30) only at a pivot protrusion end (60); and
  a first bottom abutment surface (65A) abuts a first leverage surface (68).

15. The turning tool (10) according to claim 12, wherein the support walls (32) further converge in a direction away from the base surface (26).

16. The turning tool (10) according to claim 11, wherein the tool body (12) further comprises:
  a tool relief surface (34) which extends from the base surface (26) and comprises a leverage bore (40) which opens out thereto, the leverage bore (40) intersects the pin bore (28) and comprises a female thread; and
  a cylindrical leverage member (66) with a male thread, the leverage member (66) is screw threaded in the leverage bore (40) and comprises a peripheral recess (67) with opposite first and second leverage surfaces (68, 70),
  wherein threading the cylindrical leverage member (66) outwardly with respect to the tool body (12) clamps the pin (20) with the turning insert (18), and threading the cylindrical leverage member (66) inwardly with respect to the tool body (12) releases the pin (20) from the turning insert (18).

17. The turning body (12) according to claim 1, wherein the pivot protrusion (58) is offset in the longitudinal direction below the pin midway-point (62), toward the pin bottom end (52).

18. A turning and face grooving tool (10) comprising:
  a tool body (12) having a pocket (19);
  a pin (20) having an elongated shape defining a longitudinal pin axis P; and
  a turning insert (18);
wherein:
  the pocket (16) comprises:
    a base surface (26) and transverse support walls (32); and
    a pin bore (28) comprising a pin bore inner surface (30) and opening out to the base surface (26);
  the pin (20) comprises:
    pin top and bottom ends (50, 52);
    a pin peripheral surface (54) extending therebetween; and
    a pivot protrusion (58) extending outwardly in a first direction, from the pin peripheral surface (54);
    wherein
      the pin (20) is located in the pin bore (28) and the pin top end (50) protrudes beyond the base surface (26);
      the pin (20) is rotationally asymmetric about the longitudinal pin axis P; and the pivot protrusion (58) is spaced apart from the pin top and bottom ends (50, 52) and offset in along the pin axis from a pin midway-point (62) located midway between the pin top and bottom ends (50, 52);
  the tool body (12) further comprises:
    a tool relief surface (34) extending from the base surface (26) and comprising a leverage bore (40) which opens out thereto, the leverage bore (40) intersects the pin bore (28) and comprises a female thread; and
    a cylindrical leverage member (66) comprising a male thread, the leverage member (66) is screw threaded in the pin bore (40) and comprises a peripheral recess (67) with opposite first and second leverage surfaces (68, 70); and
  threading the cylindrical leverage member (66) outwardly with respect to the tool body (12) clamps the pin (20) with the turning insert (18) to hold the turning insert (18) within the pocket (16), and threading the cylindrical leverage member (66) inwardly with respect to the tool body (12) releases the pin (20) from the turning insert (18).

19. A turning and face grooving tool body (12) having a pocket (16) and a pin (20), the pin (20) having a unitary one-piece construction and an elongated shape defining a longitudinal direction along a pin axis P;
  the pin (20) comprising:
    pin top and bottom ends (50, 52);
    a pin peripheral surface (54) extending therebetween; and
    a pivot protrusion (58) extending outwardly in a first direction from the pin peripheral surface (54);
  the pocket (16) comprising:
    a base surface (26) and transverse support walls (32) which converge in an inward direction of the pocket, parallel to the base surface (26); and
    a pin bore (28) comprising a pin bore inner surface (30) and opening out to the base surface (26);
  wherein
    the pin (20) is located in the pin bore (28) and the pin top end (50) protrudes beyond the base surface (26);
    the pin (20) is rotationally asymmetric about the longitudinal pin axis P;
    the pivot protrusion (58) is spaced apart from the pin top and bottom ends (50, 52) and offset in the longitudinal direction from a pin midway-point (62) located midway between the pin top and bottom ends (50, 52), and
    the pivot protrusion (58) is located below the pin midway-point (62), toward the pin bottom end (52).

20. The tool body (12) according to claim 19, further comprising:
  a tool relief surface (34) which extends from the base surface (26) and comprises a leverage bore (40) which opens out thereto, the leverage bore (40) intersects the pin bore (28) and comprises a female thread; and
  a cylindrical leverage member (66) with a male thread, the leverage member (66) being screw threaded in the leverage bore (40) and comprising a peripheral recess (67) with opposite first and second leverage surfaces (68, 70);
  wherein:
    the pin bottom end (52) comprises opposite first and second bottom abutment surfaces (65A, 65B), and the first bottom abutment surface (65A) is directed in the same first direction as the pivot protrusion (58); and
    the leverage member's first and second leverage surfaces (68, 70) are engaged to the pin's first and second bottom abutment surfaces (65A, 65B) such that longitudinal movement of the leverage member (66) within the leverage bore (40) results in the pin (20) pivoting about the pivot protrusion (58) within the pin bore (28).

* * * * *